United States Patent [19]

Ozawa et al.

[11] Patent Number: 5,534,591

[45] Date of Patent: Jul. 9, 1996

[54] OVERCOAT AND ADHESIVE COMPOSITIONS BASED ON CHLORINATED POLYOLEFINS HAVING HIGH CHLORINE CONTENTS

[75] Inventors: Hiroyoshi Ozawa, Tokyo; Noboru Kamiya, Saitama-ken; Ryuji Futaya, Yamanashi-ken, all of Japan

[73] Assignee: Lord Corporation, Cary, N.C.

[21] Appl. No.: 561,710

[22] Filed: Nov. 22, 1995

Related U.S. Application Data

[62] Division of Ser. No. 180,139, Jan. 11, 1994, Pat. No. 5,492,963.

[51] Int. Cl.$^6$ .................................................. C08F 8/32
[52] U.S. Cl. .................. 525/194; 525/209; 525/212; 525/235; 525/240
[58] Field of Search .................................. 525/194, 209, 525/212, 235, 240

[56] References Cited

U.S. PATENT DOCUMENTS

| | | | |
|---|---|---|---|
| 3,258,388 | 6/1966 | Coleman et al. | 161/218 |
| 3,258,389 | 6/1966 | Coleman et al. | 161/218 |
| 4,677,166 | 6/1987 | Ozaki et al. | 515/334.1 |
| 4,824,906 | 4/1989 | Honsberg et al. | 515/334.1 |
| 4,978,703 | 12/1990 | Ainsworth et al. | 515/147 |
| 4,978,716 | 12/1990 | Flynn et al. | |
| 5,180,791 | 1/1993 | Kimura et al. | 525/358 |
| 5,385,979 | 1/1995 | Ozawa et al. | |

FOREIGN PATENT DOCUMENTS

| | | |
|---|---|---|
| 3199206A | 8/1991 | Japan . |
| 3199207A | 8/1991 | Japan . |
| 3199274A | 8/1991 | Japan . |
| 4036302A | 2/1992 | Japan . |
| 4046905A | 2/1992 | Japan . |
| 4173808A | 6/1992 | Japan . |
| 2239457A | 7/1991 | United Kingdom . |

*Primary Examiner*—Bernard Lipman
*Attorney, Agent, or Firm*—Wayne W. Rupert

[57] ABSTRACT

Adhesive compositions based on chlorinated polyolefins having chlorine contents greater than about 60 percent and molecular weights greater than about 500. The adhesive compositions contain the chlorinated polyolefin and a crosslinking agent. The chlorinated polyolefins are advantageous in that they can be prepared in an environmentally acceptable manner and can be utilized as a substitute for the traditional chlorinated natural rubber materials utilized in adhesive compositions without compromising adhesive performance. Preferred chlorinated polyolefins are prepared by a process involving the dispersion and chlorination of high surface area polyolefinic particles in an aqueous medium.

3 Claims, No Drawings

OVERCOAT AND ADHESIVE COMPOSITIONS BASED ON CHLORINATED POLYOLEFINS HAVING HIGH CHLORINE CONTENTS

This application is a division of application Ser. No. 08/180,139, filed Jan. 11, 1994, now U.S. Pat. No. 5,492,963.

FIELD OF THE INVENTION

The present invention relates to adhesive compositions useful for bonding various materials such as elastomeric materials to metal substrates. More specifically, the present invention relates to adhesive compositions based on chlorinated polyolefins having significantly high chlorine contents.

BACKGROUND OF THE INVENTION

There is a wide variety of adhesive compositions currently available for bonding elastomeric materials to metal surfaces. Many of these adhesive compositions utilize various halogenated polymers to provide the adhesive compositions with film-forming capability, enhanced adhesion, and resistance to adverse environmental conditions. One of the most common and most effective halogenated polymeric materials is chlorinated natural rubber or chlorinated synthetic rubber such as chlorinated polyisoprene. The chlorinated natural and synthetic rubbers have been found to provide excellent film-forming properties, adhesional affinity for both metal surfaces and vulcanizing elastomers, and environmental resistance when utilized in adhesive compositions for bonding elastomeric materials to metal surfaces.

The process for preparing the chlorinated rubber materials traditionally employed in adhesive compositions typically involves the utilization of highly chlorinated solvents such as carbon tetrachloride. The increasing number of environmental regulations relating to chlorinated solvents has limited the availability and usability of many chlorinated solvents. In fact, the utilization of chlorinated solvents in industry may become totally prohibited in the very near future.

Processes for preparing chlorinated rubber materials which do not utilize chlorinated solvents are therefore currently being explored. However, a process has yet to be developed which produces chlorinated rubber materials equivalent to the materials produced by a process based on chlorinated solvents such as carbon tetrachloride. Therefore, the adhesive industry is searching for alternative materials which can be prepared without the utilization of chlorinated solvents and which can act as an effective substitute for the traditional chlorinated rubber materials.

Chlorinated polyolefins, such as chlorinated polyethylene, can be prepared without the utilization of chlorinated solvents and have previously been considered for utilization in rubber-to-metal adhesive compositions as alternatives to chlorinated rubber materials. Chlorinated polyolefins, however, have traditionally not provided adequate metal-wetting capability or environmental resistance so as to be effective for use in rubber-to-metal adhesive compositions.

A need therefore exists for a chlorinated polymeric material which can be prepared without the utilization of chlorinated solvents and which can be utilized as an effective substitute for the traditional chlorinated rubber materials.

SUMMARY OF THE INVENTION

The present invention relates to chlorinated polyolefins which can be prepared without the utilization of chlorinated solvents and which can be utilized in rubber-to-metal adhesive compositions so as to provide effective metal-wetting capability, adhesional affinity for vulcanizing rubber, and environmental resistance. It has presently been unexpectedly discovered that chlorinated polyolefins having significantly high chlorine contents can be utilized in adhesive compositions so as to provide performance equivalent to or greater than the performance provided by the traditional chlorinated rubber materials utilized in adhesive compositions. More specifically, the present invention relates to an adhesive composition comprising a chlorinated polyolefin and a crosslinking agent wherein the chlorinated polyolefin has a chlorine content greater than about 60 percent and a molecular weight greater than about 500. The highly chlorinated polyolefins of the invention are preferably prepared by a process involving the dispersion and chlorination of high surface area polyolefinic particles in an aqueous medium.

DETAILED DESCRIPTION OF THE INVENTION

The polyolefin of the chlorinated polyolefin of the present invention can essentially be any polyolefin derived from ethylene and/or propylene monomers. Typical examples of polyolefins that can be utilized to prepare the chlorinated polyolefins of the present invention include polyethylene, polypropylene, ethylene-propylene copolymer, ethylene-propylene-diene terpolymer, ethylene-propylene-hexadiene terpolymer, ethylene-propylenedicyclopentadiene terpolymer, ethylene-propylene-ethylidenenorbornene terpolymer, with polyethylene being presently preferred.

The polyolefins of the invention may be chlorinated by techniques such as dissolving or dispersing the polyolefin in a solvent or water and subjecting the resulting solution to chlorine gas. Other chlorination methods suitable for preparing the chlorinated polyolefins of the present invention include directing chlorine gas into melted or molten polyolefin. Whatever method is utilized, it is essential that the chlorination be carried out until the chlorine content of the polyolefin is in the range from about 60 to 75 percent, preferably from about 65 to 70 percent. The chlorinated polyolefins will typically have a molecular weight ranging from about 500 to 15,000, preferably from about 1,000 to 7,000. A chlorinated polyolefin having the specific chlorine contents and molecular weights described above will also typically have a viscosity in toluene at 20 weight percent and 25° C. of between about 10 centipoise and 500 centipoise, preferably between about 100 centipoise and 350 centipoise. As stated above, it is the significantly high chlorine content that has presently been found to cause the chlorinated polyolefins to exhibit the superior properties of the present invention.

A certain class of polyolefins has been found to be particularly useful in adhesive compositions for purposes of the present invention. This class of chlorinated polyolefins is prepared from environmentally acceptable processes which do not involve the utilization of chlorinated solvents such as carbon tetrachloride. These environmentally acceptable processes have been found to readily produce chlorinated polyolefins having the significantly high chlorine contents required by the present invention. A number of these environmentally acceptable processes are disclosed in, for example, Japanese Patent Application Nos. 4173808, 4036302, 3199274, 3199206, 3199207, and 4046905 as well as in U.S. Pat. No. 5,180,791.

An exemplary environmentally acceptable process utilized to prepare the preferred chlorinated polyolefins of the invention generally first involves the formation of a suspension or dispersion of a fine polyolefin powder having a high surface area in water. The suspension or dispersion is typically stabilized by the use of a surfactant such as non-ionic and/or anionic type surfactants. Examples of non-ionic type surfactants include polyoxyalkylene condensates of long chain fatty acids or alcohols such as stearic acid or oleyl alcohol, or sorbitan derivatives of same, such as sorbitan monostearate and their combinations, while examples of anionic type surfactants include long chain fatty acid soaps such as sodium stearate, alcohol sulfates, and related materials. A preferred anionic surfactant for preparing an aqueous suspension or dispersion of polyethylene powder is sodium stearate.

The aqueous suspension or dispersion of the polyolefin is then typically subjected to chlorine gas in the presence of free-radical initiators or ultraviolet irradiation. The chlorination is normally carried out in the temperature range from about 0° C. to 70° C. The chlorination process may be interrupted at a point where the polyolefin chlorine content is less than 55 percent and the dispersion then ball-milled or processed mechanically so as to expose the inner portion of each dispersed polyolefin particle. This enables chlorination to proceed at a faster rate than would be otherwise possible from that point. It is important that chlorination conditions be not so severe as to cause considerable chain scissioning of the polyolefin polymer chains. When the desired chlorination level is reached, the chlorinated polyolefin may be separated by filtration, washed with water, and dried under vacuum.

An example of a preferred environmentally acceptable process useful for preparing the high chlorine content chlorinated polyethylenes of the present invention utilizes finely pulverized polyolefin powder having a surface area of from about 300 to 20,000 cm$^2$/g suspended in an aqueous medium and is described in detail in UK Patent Application No. 2 239 457A and U.S. Pat. No. 5,180,791.

The chlorinated polyolefins are typically utilized in an amount ranging from about 5 to 95, preferably from about 25 to 70, percent by weight of the essential ingredients of the present invention. Essential ingredients of the present invention herein refers to the chlorinated polyolefin and the crosslinking agent.

The crosslinking agent of the invention can be essentially any compound capable of crosslinking the chlorinated polyolefins of the present invention. Examples of crosslinking agents useful in the present invention include aromatic nitroso compounds, aromatic dioximes and aliphatic bis-nitroamines with aromatic nitroso compounds being presently preferred.

The preferred aromatic nitroso compounds of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

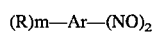

$$(R)_m-Ar-(NO)_2$$

wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro- 1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene.

The crosslinking agent of the invention is typically utilized in an amount ranging from about 10 to 60, preferably about 30 to 40, percent by weight of the essential ingredients of the present invention.

In addition to the chlorinated polyolefin, the adhesive compositions of the present invention preferably contain an additional halogenated polymeric material which can function, in addition to the chlorinated polyolefin described above, as a film-forming component. The additional halogenated polymeric material may be essentially any halogenated polymer other than chlorinated polyolefins having the specific chlorine contents and molecular weights described above, and representative examples include chlorinated natural rubber, chlorine- and bromine-containing synthetic rubbers including polychloroprene, chlorinated polychloroprene, chlorinated polybutadiene, butadiene/halogenated cyclic conjugated diene adducts, chlorinated butadiene styrene copolymers, chlorosulfonated polyethylene, brominated poly(2,3-dichloro-1,3-butadiene), copolymers of α-haloacrylonitriles and 2,3-dichloro-1,3-butadiene, polyvinyl-butyral, chlorinated poly(vinyl chloride), and mixtures thereof. Thus substantially any of the known halogen-containing derivatives of natural and synthetic elastomers can be employed as additional halogenated polymeric materials in the practice of this invention, including mixtures of such elastomers. It is presently preferred to utilize brominated poly(2,3-dichloro-1,3-butadiene) and/or chlorosulfonated polyethylene as the additional halogenated polymeric material of the invention.

If utilized, the additional halogenated polymeric material is typically employed in an amount ranging from about 1 to 99, preferably from about 10 to 40, percent by weight of the total ingredients (excluding water and solvent) of the adhesive composition.

The adhesive compositions of the present invention may optionally contain an acid-scavenging compound for purposes of consuming any acid compound by-products produced during the bonding process. The acid-scavenging compound of the present invention can be any known metal oxide such as the oxides of zinc, cadmium, magnesium, lead, and zirconium; litharge; zirconium salts; and combinations thereof. Various lead-containing compounds may also be utilized as an acid-scavenging compound in lieu of, or in addition to, the metal oxide. Examples of such lead-containing compounds include lead salts such as polybasic lead salts of phosphorous acid and saturated and unsaturated organic dicarboxylic acids and acid anhydrides. Specific examples of lead salts include dibasic lead phthalate, monohydrous tribasic lead maleate, tetrabasic lead fumarate, dibasic lead phosphite, and mixtures thereof. Other examples of lead-containing compounds include basic lead carbonate, lead oxide and lead dioxide. The acid-scavenging compound may also be an oxirane (epoxy) compound.

If utilized, the acid-scavenging compound is typically employed in an amount ranging from about 0.1 to 10, preferably from about 0.5 to 2, percent by weight of the total ingredients (excluding water and solvent) of the adhesive composition.

The adhesive compositions of the present invention can optionally contain other well-known additives including plasticizers, fillers, pigments, surfactants, dispersing agents, wetting agents, reinforcing agents and the like, in amounts employed by those skilled in the adhesive arts to obtain a desired color and consistency. Examples of optional ingredients include carbon black, silica such as fumed silica, sodium aluminosilicate, and titanium dioxide and organic pigments or dyestuffs.

The adhesive compositions of the present invention may be prepared as solvent-based or water-based formulations. In the case of a solvent-based formulation, the ingredients of the adhesive are combined in an appropriate solvent. The solvent may essentially be any solvent capable of adequately dissolving the ingredients for purposes of forming an adhesive composition capable of being applied as a thin film. Solvents useful for preparing formulations according to the present invention include aliphatic ketones, such as methylethyl ketone, methylisobutyl ketone, aliphatic esters such as ethylacetate and butyl acetate, and aromatic hydrocarbons such as toluene and xylene. The solvent is typically utilized in an amount sufficient to obtain a total solids (non-volatile) content ranging from about 10 to 40, preferably from about 20 to 30, percent.

In the case of water-based formulations, the chlorinated polyolefin is utilized in the form of a latex. The latex of the chlorinated polyolefin may be prepared according to methods known in the art such as by dissolving the chlorinated polyolefin in a solvent and adding a surfactant to the resulting solution. Water can then be added to the solution under high shear to emulsify the polymer. The solvent is then stripped to obtain a latex which can be suitably utilized in a water-based formulation. The latex of the chlorinated polyolefin is then combined with the other ingredients and a sufficient amount of water, preferably deionized water, so as to prepare an adhesive composition having a typical total solids content of between about 10 and 70 percent, preferably between about 30 and 50 percent.

The adhesive compositions may be applied to a surface to be bonded by spraying, dipping, brushing, wiping, roll-coating or the like, after which the adhesive composition is permitted to dry. The adhesive composition is typically applied in an amount sufficient to form a dry film thickness ranging from about 0.1 to 1.0 mils, preferably from about 0.2 to 0.8 mils.

The adhesive compositions of the present invention are capable of bonding any substrate or surface capable of receiving the adhesive composition. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, styrene-butadiene copolymer rubber, isobutylene-isoprene copolymer rubber, ethylene-propylene diene terpolymer rubber, acrylonitrile-butadiene copolymer rubber, brominated isobutylene-isoprene copolymer rubber, and the like. The surface to which the material is bonded can be any surface capable of receiving the adhesive such as a glass, plastic, or fabric surface, and is preferably a metal surface selected from any of the common structural metals such as iron, steel (including stainless steel), chemically treated steel such as zinc-phosphatized steel, lead, aluminum, chemically treated aluminum such as anodized aluminum, copper, brass, bronze, Monel metal, nickel, zinc, and the like.

The present adhesive compositions are preferably utilized to bond an elastomeric material to a metal surface. The adhesive composition is typically applied to the metal surface and the coated metal surface and elastomeric substrate are then brought together under heat and pressure to complete the bonding procedure. The surface of the metal and the elastomeric substrate are typically brought together under a pressure of from about 20.7 to 172.4 Mega Pascals (M Pa), preferably from about 20 MPa to 50 MPa. The resulting rubber-metal assembly is simultaneously heated to a temperature of from about 130° C. to 220° C., preferably from about 140° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The adhesive compositions of fie invention may be utilized in one- or two-coat adhesive systems. In a one-coat system, the adhesive composition is simply applied between the materials to be bonded. In a two-coat system, the present adhesive composition is utilized as an adhesive overcoat which is typically applied to a metal surface which has first been primed with a conventional adhesive primer.

The following examples are provided for purposes of illustrating the invention and are not intended to limit the scope of the present invention which is defined by the claims.

EXAMPLE 1

To a disperser is added 1,100 g of xylene and while running the disperser, 90 g of carbon black, 60 g of dibasic lead phosphite, 5 g of fumed silica, and 30 g of p-dinitrosobenzene are added in this order. The temperature of the resulting p-dinitrosobenzene dispersion is kept below 60° C., and the disperser is stopped when the fineness, as measured with a HAGEMAN grind gauge, reaches 1.5 mils or less. To a blending vessel equipped with a stirrer is then added 1,400 g of xylene. The stirrer is started and 600 g of chlorinated polyethylene (CPE-HE 1200-Nippon Paper Industries) having a viscosity in 20 percent by weight toluene solution at 25° C. of 350 cps and a chlorine content of 67 percent, is added to the blending vessel and dissolved to form a chlorinated polyethylene solution. The above p-dinitrosobenzene dispersion and 200 g of 30 percent by weight brominated poly-2,3-dichlorobutadiene (23 percent bromine content) perchloroethylene solution are added to the chlorinated polyethylene solution in this order and the blend is stirred for 1 hour.

EXAMPLE 2

An adhesive is prepared by the same procedure as in Example 1, except that the viscosity and chlorine content of the chlorinated polyethylene employed are 70 cps and 68 percent, respectively.

Comparative Example 3

An adhesive is prepared by the same procedure as in Example 1, except that chlorinated natural rubber (ADK CR-701-Asahi Denka Kogyo K.K.) is employed in place of the chlorinated polyethylene. The viscosity and chlorine content of the chlorinated natural rubber are 169 cps and 67 percent, respectively.

The adhesive compositions prepared above in Examples 1–3 are coated onto grit-blasted, degreased 1.6 mm×25 mm×60 mm steel coupons by dipping the coupons in the adhesive compositions. The coated coupons are allowed to dry for approximately one hour at ambient conditions.

The coated coupons are bonded to natural rubber (NR), isobutylene-isoprene copolymer rubber (IIR), and styrene-butadiene copolymer rubber (SBR). The rubber is bonded to the coated coupons by compression molding at a pressure of 100 kg ft./cm². The bonding temperatures and times for the NR, IIR, and SBR substrates are 154° C., 160° C. and 154° C.; and 5 minutes, 30 minutes, and 30 minutes, respectively. Some of the coated coupons are exposed to pre-bake or pre-cure heat conditions. When pre-baked, the coupons are exposed to a temperature of 154° C. for 5 minutes. This simulates actual production conditions and helps determine if the adhesive remains active enough to successfully bond the rubber compound. The bonded rubber-metal assemblies are then subjected to the following tests.

Initial Adhesion

Bonded parts are pulled to destruction according to ASTM Test D429 - Method B. Parts are tested in peel with a peel angle of 45 degrees. The test is conducted at room temperature with a test speed of 20 inches per minute. After the bonded part fails, the peak peel strength value (measured in kg/in.) and the percent rubber retention on the adhesive coated area of the part are measured.

Two-Hour Boiling Water

Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then placed in a beaker filled with boiling tap water. The parts remain in this environment for 2 hours. The peel strength and percent rubber retention on the part are then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself. The indication X/YR means that the adhesive exhibited a peel strength of X kg/in. and a rubber failure of Y percent.

TABLE 1

| Substrate | Test | Ex. 1 | Ex. 2 | Ex. 3 |
| --- | --- | --- | --- | --- |
| NR | Initial | 32.8/100 R | 13.3/2 R | 25.8/100 R |
|  | Boiling water | 36.2/99 R | 16.9/6 R | 28.2/96 R |
|  | Initial[a] | 13.6/40 R | 7.2/0 R | 8.6/0 R |
| IIR | Initial | 47.2/99 R | 48.8/98 R | 43.6/66R |
| SBR | Initial | 83.5/100 R | 88.0/97 R | 63.5/98 R |

[a] Subjected to prebake of 154° C. for 5 minutes.

EXAMPLE 4

To a disperser is added 122 g of xylene and while running the disperser, 10 g of carbon black, 5.0 g of dibasic lead phosphite, and 28 g of p-dinitrosobenzene pre-dispersed in xylene (at 37.2% non-volatile content) are added in this order. The temperature of the dispersion is kept below 60° C. and the dispersion is continued until the fineness of the dispersion as measured with a HAGEMAN grind gauge reaches 1.5 mils or less. Then 10 g of chlorinated polyethylene (CPE-HE 1200 - Nippon Paper Industries) having a viscosity in 20 percent by weight toluene solution at 25° C. of 350 cps and a chlorine content of 67 percent chlorinated polyethylene is added to the dispersion and mixing is continued until the chlorinated polyethylene dissolves to form an intermediate dispersion.

To a blending vessel equipped with a stirrer is added 84.5 g of xylene. Then an additional 50 g of the chlorinated polyethylene is added to the blending vessel under agitation along with 175 g of the above intermediate dispersion. To the resulting mixture is then added 125 g of a 12.0 percent solution in toluene of chlorosulfonated polyethylene (HYPALON 45-E. I. Du Pont de Nemours & Co.), and 85.5 g of brominated poly-2,3-dichlorobutadiene (23 percent bromine content) solution in perchloroethylene at 29.2 percent non-volatile content.

The final formulation, comprising 60 g total of chlorinated polyethylene, 25 g of brominated poly-2,3-dichlorobutadiene, 15 g of chlorosulfonated polyethylene, 10 g of p-dinitrosobenzene, 10 g of carbon black, and 5.0 g of dibasic lead phosphate as its non-volatile ingredients, has an overall non-volatile content of 24.0 percent.

Comparative Example 5

An adhesive composition is prepared according to Example 4 except that the intermediate dispersion comprises 123.1 g of xylene, 10 g of carbon black, 5.0 g of dibasic lead phosphite, 26.9 g of p-dinitrosobenzene (itself predispersed in xylene at 37.2 percent non-volatile content), and 10 g of the same chlorinated natural rubber as used in Example 3.

The final formulation, comprising 70 g total of chlorinated natural rubber, 30 g of brominated polydichlorobutadiene, 10 g of p-dinitrosobenzene, 10 g of carbon black, and 5.0 g of dibasic lead phosphate as its nonvolatile ingredients, also has an overall non-volatile content of 24.0 percent.

Grit blasted steel coupons that have also been solvent degreased are dip-coated with a conventional primer (CHEMLOK 205-Lord Corporation), dried, and then dip-coated with the two overcoat adhesives of Examples 4 and 5. The coated coupons are bonded to ¼" thick pads of a standard formulation of natural rubber by placing them in a compression mold for 15 minutes at 154° C. They are tested for initial bond strength and percent rubber failure, and also for percent rubber failure after being stressed and exposed to boiling water for 3 hours. The results are shown below in Table 2.

TABLE 2

| Substrate | Test | Ex. 4 | Ex. 5 |
| --- | --- | --- | --- |
| NR | Initial | 30/100 R | 27/100 R |
|  | Boiling water | 100 R | 100 R |

EXAMPLE 6

To a vessel equipped with a stirrer is added 1200 g of xylene. The stirrer is started and 150 g of chlorosulfonated polyethylene (HYPALON 40 E. I. Du Pont de Nemours & Co.) with a chlorine content of 36 percent by weight is added and dissolved to form an intermediate solution.

To a disperser is added 510 g of xylene. While running the disperser, 45 g of carbon black, 100 g of dibasic lead phosphite, and 90 g of p-dinitrosobenzene are added in this order. The temperature of the dispersion is kept below 60° C. When the fineness, as measured with a HAGEMAN grind gauge, reaches 1.5 mils or less, 100 g of the above intermediate solution of chorosulfonated polyethylene is added to the dispersion.

The disperser is stopped when the fineness reaches 1.5 mils or less. Then the dispersion, 45 g of chlorinated polyethylene (CPE-HE 1200- Nippon Paper Industries) with viscosity of 20 percent by weight toluene solution at 25° C. and chlorine content of 170 cps and 69 percent respectively, and 200 g of chlorinated paraffin as a plasticizer are added to the remaining chlorosulfonated polyethylene solution and the blend is stirred for 1 hour.

EXAMPLE 7

An adhesive is prepared by the same procedure as Example 6, but the viscosity and chlorine content of the chlorinated polyethylene employed are 180 cps and 69 percent respectively.

EXAMPLE 8

An adhesive is prepared by the same procedure as Example 6, except that the chlorinated natural rubber of Example 3 is employed in place of the chlorinated polyethylene.

Bonding and test methods employed for these adhesives are the same as Example 3 except that a conventional primer (CHEMLOK 205-Lord Corporation) is applied at a dry film thickness of approximately 0.3 mils to the test coupons and dried before applying these adhesives. The bonding temperature and time for the ethylene-propylene-diene terpolymer rubber substrate (EPDM) are 160° C. and 30 minutes. The test results are shown below in Table 3.

TABLE 3

| Rubber Compound | Test Items | Ex. 6 | Ex. 7 | Ex. 8 |
| --- | --- | --- | --- | --- |
| NR | Initial | 29.0 - 100% R | 29.1 - 100% R | 29.3 - 100% R |
|  | Boiling Water | 34.3 - 97% R | 34.0 - 90% R | 33.1 - 95% R |
|  | Initial[a] | 29.5 - 97% R | 30.3 - 98% R | 30.5 - 97% R |
| IIR | Initial | 49.8 - 100% R | 51.1 - 100% R | 51.0 - 100% R |
|  | Boiling Water | 51.5 - 99% R | 50.3 - 99% R | 51.3 - 99% R |
|  | Initial[a] | 48.5 - 98% R | 47.3 - 98% R | 46.8 - 100% R |
| SBR | Initial | 75.1 - 100% R | 75.8 - 100% R | 74.8 - 100% R |
|  | Boiling Water | 80.6 - 99% R | 81.6 - 99% R | 81.3 - 98% R |
|  | Initial[a] | 73.1 - 100% R | 75.0 - 100% R | 75.5 - 100% R |
| EPDM | Initial | 30.1 - 30% R | 30.1 - 32% R | 21.1 - 3% R |
|  | Boiling Water | 28.0 - 32% R | 29.3 - 35% R | 21.5 - 9% R |
|  | Initial[a] | 15.0 - 0% R | 14.8 - 0% R | 15.0% R |

[a]Subjected to prebake for 20 minutes at 150° C.

As can be seen from the above data, the chlorinated polyolefins of the present invention provide adhesive performance equivalent to or greater than that provided by traditional chlorinated rubber materials.

What is claimed is:

1. An adhesive composition comprising a first chlorinated polyolefin, a crosslinking agent for said chlorinated polyolefin, and a second halogenated polymeric material, wherein the chlorinated polyolefin has a chlorine content greater than about 60 percent and a molecular weight greater than about 500.

2. An adhesive composition according to claim 1 wherein the second halogenated polymeric material is selected from the group consisting of chlorinated natural rubber, chlorine- and bromine-containing synthetic rubbers including polychloroprene, chlorinated polychloroprene, chlorinated polybutadiene, butadiene/halogenated cyclic conjugated diene adducts, chlorinated butadiene styrene copolymers, chlorosulfonated polyethylene, brominated poly(2,3-dichloro-1,3-butadiene), copolymers of α-haloacrylonitriles and 2,3-dichloro-1,3-butadiene, polyvinylbutyral, chlorinated poly(vinyl chloride), and mixtures thereof.

3. An adhesive composition according to claim 2 wherein the second halogenated polymeric material is brominated poly(2,3-dichloro-1,3-butadiene), chlorosulfonated polyethylene or a combination thereof.

* * * * *